Figure 1:
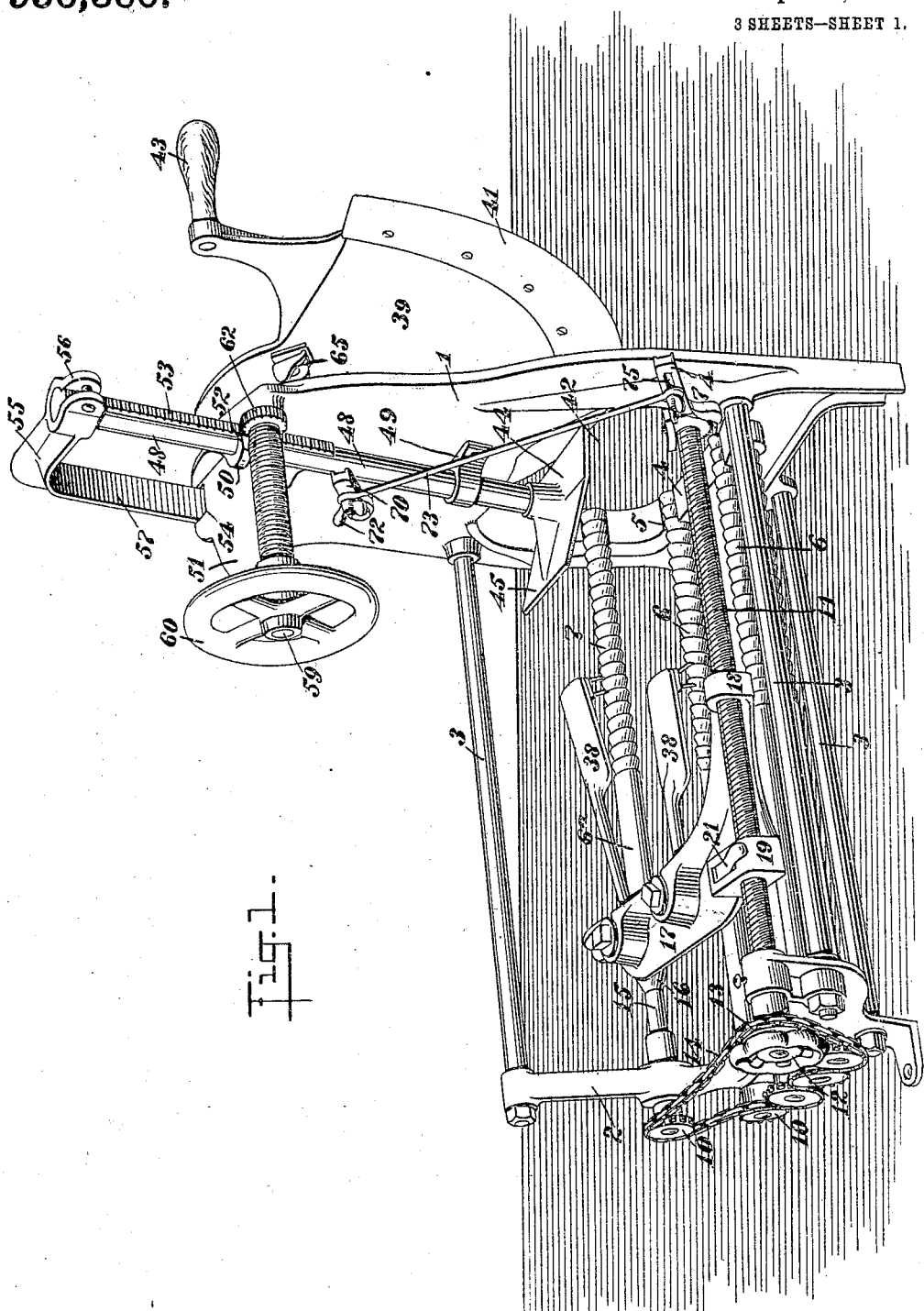

A. W. JOHNSON.
MEAT SLICER.
APPLICATION FILED MAY 7, 1909.

956,360.

Patented Apr. 26, 1910.
3 SHEETS—SHEET 1.

WITNESSES

INVENTOR
Alfred W. Johnson
BY
ATTORNEYS

A. W. JOHNSON.
MEAT SLICER.
APPLICATION FILED MAY 7, 1909.
956,360.
Patented Apr. 26, 1910.
3 SHEETS—SHEET 2.
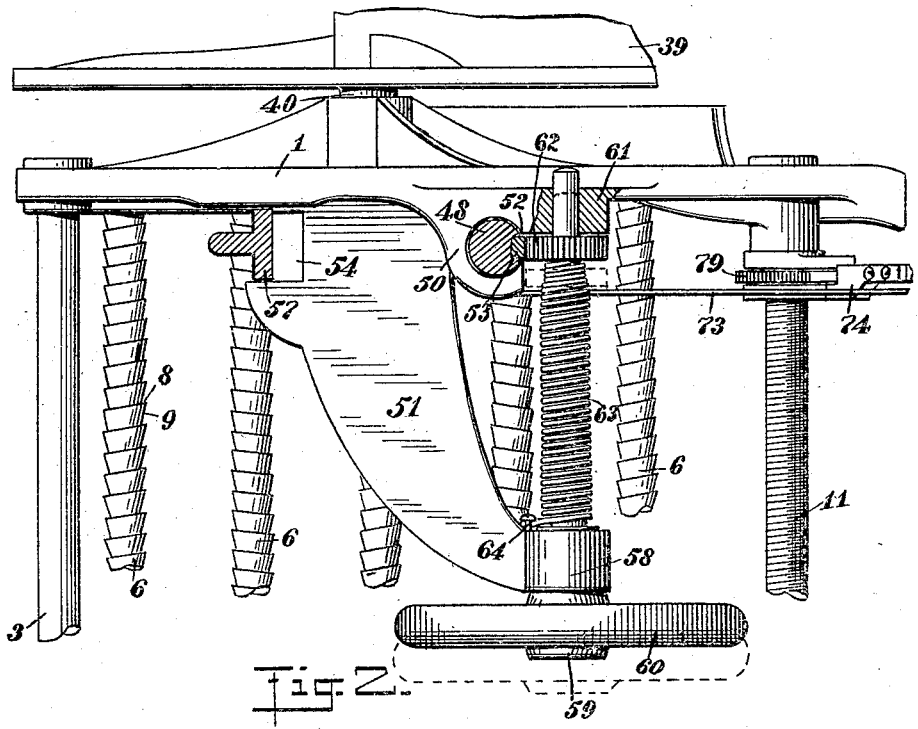
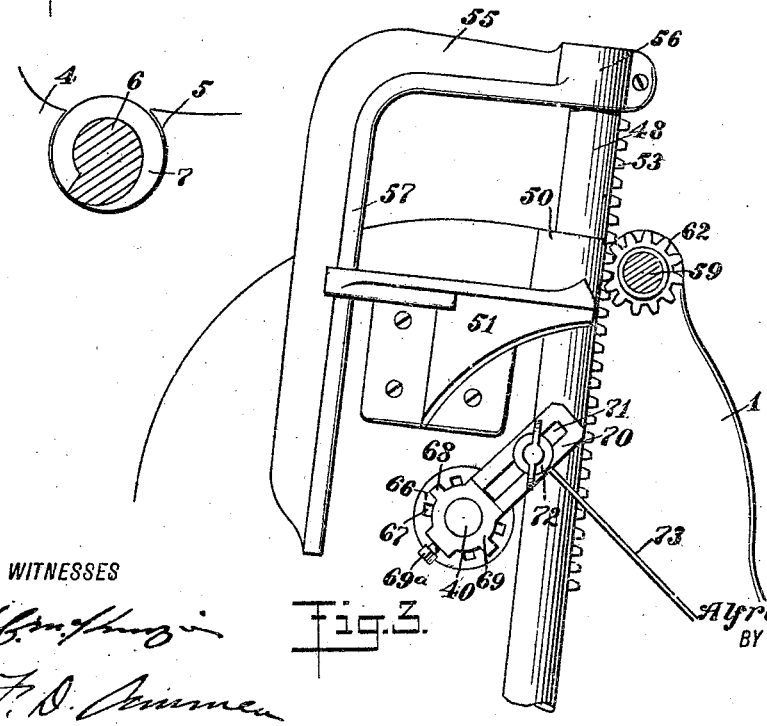
WITNESSES
INVENTOR
Alfred W. Johnson
BY
ATTORNEYS

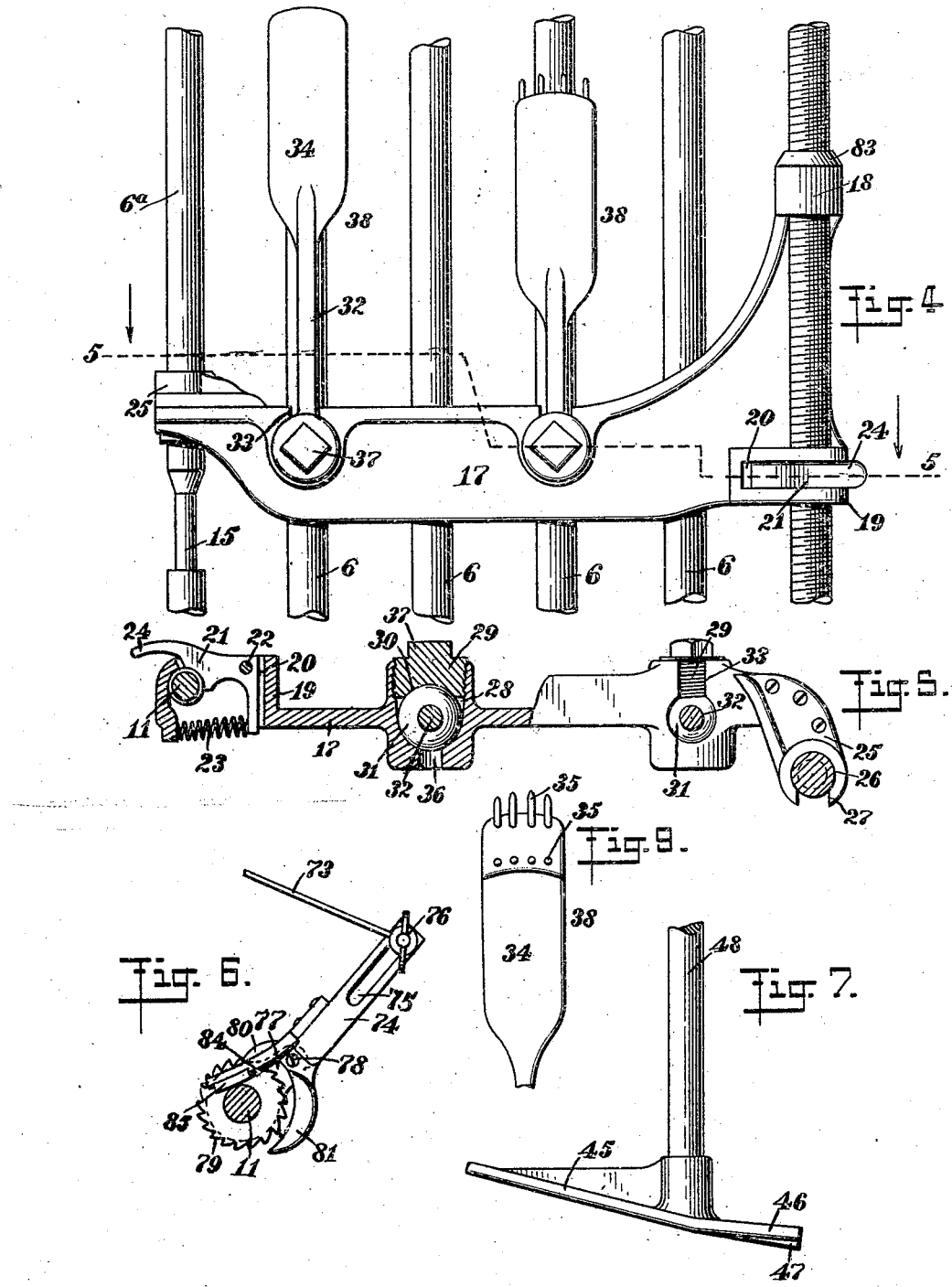

UNITED STATES PATENT OFFICE.

ALFRED W. JOHNSON, OF NEW BRUNSWICK, NEW JERSEY.

MEAT-SLICER.

956,360.     Specification of Letters Patent.     Patented Apr. 26, 1910.

Application filed May 7, 1909. Serial No. 494,592.

*To all whom it may concern:*

Be it known that I, ALFRED W. JOHNSON, a citizen of the United States, and a resident of New Brunswick, in the county of Middlesex and State of New Jersey, have invented a new and Improved Meat-Slicer, of which the following is a full, clear, and exact description.

This invention relates to meat slicers such as used for making slices from roast beef, corned beef, and similar meats. In its general construction the device presents a cradle upon which the cut of meat rests, and the frame of the device supports a knife toward which the meat is automatically advanced by the operation of the knife.

The object of this invention is to improve the construction of the feeding means, to provide improved means for holding the meat in the cradle, and to provide automatic means for throwing out the feed when the limit of forward movement of the meat is reached. The device includes also a presser plate which presses down on the upper side of the meat, and the invention includes improved means for controlling and regulating the pressure exerted by this plate.

The invention resides also in the details of construction of the means for guiding the presser plate and in the construction of the body of the presser plate.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective of a meat slicer constructed according to my invention; Fig. 2 is a plan of the end of the machine adjacent to the blade in order to illustrate the means for operating the presser plate, certain parts being broken away and shown in section; Fig. 3 is an elevation further illustrating the means for guiding and controlling the presser plate, certain parts being shown in cross section; Fig. 4 is a plan showing the opposite end of the machine from which the meat is advanced; Fig. 5 is a cross section on the line 5—5 of Fig. 4 looking in the direction of the arrows, this view, of course showing the parts reversed with respect to Fig. 4; Fig. 6 is a detail vertical section showing the automatic means for throwing out the feed mechanism when the limit of advance of the meat is about reached; Fig. 7 is a side elevation of a presser plate and showing a portion of its spindle; Fig. 8 is an edge view of the presser plate shown in Fig. 7; Fig. 9 is a bottom plan of a portion of one of the meat holders; and Fig. 10 is a detail illustrating the manner of mounting the worms in the feed rest.

Referring more particularly to the parts, and especially to Fig. 1, 1 represents the main frame plate which is arranged opposite to a smaller frame plate 2, and these frame plates 1 and 2 are connected rigidly by horizontal frame rods 3. The lower portion of the frame plate 1 is formed into a substantially horizontal cross bar or feed rest 4, and this feed rest is provided with transverse grooves 5 which are of substantially circular form, as indicated in Fig. 10, but the upper edges of these openings cut through the upper face of the feed rest, as indicated. These openings 5 constitute bearings for the ends of worm shafts indicated collectively by the number 6. The ends of these worm shafts adjacent to the frame plate 1, are cut into the form of screws or worms 7. These worms are formed by a helical groove which is cut in an inclined manner so as to present projecting shoulders 8, on the side adjacent to the frame plate 1, and inclined faces 9 on the other side. The ends of these worm shafts 6, remote from the frame plate 1, are rotatably mounted in the frame plate 2 and extend beyond the frame plate so as to receive rigidly sprocket wheels 10 which are attached as indicated. At one side of the machine a feed screw 11 is provided which is threaded throughout substantially its entire length, as indicated. This feed screw is also rotatably mounted in the frame plate 2 and its projecting end is provided with a hand wheel 12 for rotating it when desired. To this hand wheel a sprocket wheel 13 is attached, and a sprocket chain 14 passes over this sprocket wheel 13 and around the sprocket wheels 10. As indicated in Fig. 2 there are five of the worm shafts and the sprocket chain is arranged so that it passes under and over the sprocket wheels of the worm shafts so as to rotate adjacent worm shafts in opposite directions. As indicated in Fig. 2, the adjacent worm shafts have their feed grooves or threads cut in opposite directions to each other, that is, if one is right-hand, the adjacent one is left-hand. As shown in Fig. 10, the upper edges of the worms 7 project slightly above the face of the feed rest for a purpose which will appear more clearly hereinafter.

The worm shaft 6ª which is disposed at the left of the machine is provided with a neck 15 of reduced diameter, and this neck is connected by a conical shoulder 16 with the larger diameter of the worm shaft. Mounted to slide on this worm shaft 6ª, and also on the feed screw 11, there is provided a cross head 17. This cross head is provided with two sleeves 18 and 19, respectively, which run on the feed screw, and the sleeve 19 is provided with an opening 20, as indicated at the left in Fig. 5. In this opening a nut lever 21 is pivotally mounted at 22. This nut lever has segmental threads which engage the threads of the feed screw, as will be readily understood, and the engagement of the nut lever is normally maintained by means of a compression spring 23, as shown. The nut lever has a projecting handle 24 which may be raised in order to disconnect it from the threads, at which time the cross head may be slid freely along the cradle of the machine, which cradle is formed by the parallel worms and frame rods.

Adjacent to the worm shaft 6ª, the cross head 17 is provided with a saddle bracket 25 which has a collar 26 presenting a substantially circular opening which fits the large diameter of the worm shaft 6ª. The lower side of this collar is provided with an open slot 27 which passes completely through the lower side of the collar, and this lower slot is of a width slightly greater than the diameter of the reduced neck 15. From this engagement, when the saddle bracket 25 is disposed at the neck 15, the cross head may be readily raised to be swung upwardly at its left end rotating on the axis of the feed screw 11. The cross head 17 is provided with cup sockets 28 which open upwardly and which are closed by screw plugs 29. These screw plugs 29 are formed with spherical concave lower faces 30 which adapt them to clamp balls 31 which seat in the sockets, as indicated. These balls have stems 32 which extend through slots 33 formed in the forward side of the cross head. The forward extremities of these stems 32 are formed into grippers or heads 34. They are simply enlarged flat and elongated, and are provided on their under sides with spikes or spurs 35 which are adapted to engage with the meat so as to enable it to be pushed ahead by the slide or cross head when advancing under the feed movement. As indicated in Fig. 5, the bottoms of the sockets 28 fit the curvature of the balls and these bottoms are provided with openings 36 which give the balls a better seat and which facilitate the removal of any obstruction which may come under the balls as they come upon their seats. The screw plugs 29 have angular heads 37, enabling them to be rotated by means of a wrench. The stems 32 with the heads 34 constitute pushers 38 for engaging and advancing the meat. These pushers can be clamped at any desired angle on account of their ball and socket connection with the cross head.

On the outer side of the frame plate 1, a knife 39 is rotatably mounted through the medium of a shaft 40 which passes through the frame plate. This knife 39 presents a curved blade 41 which is adapted to swing across an opening 42 in the frame plate 1 toward which the meat is advanced. The knife is operated by a suitable handle 43 which projects away from the frame plate, as indicated. In operating the knife it is rotated continuously in one direction, and in each revolution its blade 41 makes a slice from the meat. In order to hold the meat firmly as it is presented to the knife, I provide a presser plate or presser foot 44. This presser foot presents an upwardly inclined plate body 45 on the side from which the meat approaches, and presents a less inclined flange plate 46 on the opposite side. The plate 46 is provided on its under side with tapering ribs 47, as shown in Fig. 8. These ribs are arranged longitudinally of the direction in which the meat advances, and are of increasing depth toward the slicing point. The presser foot is rigidly attached to a stem or spindle 48 which is mounted to slide in a vertical plane on the face of the frame plate 1 by means of two integral brackets or lugs 49 and 50. The upper part of this stem slides in the guide lug 50 on the upper part of the frame plate 1, as indicated in Fig. 3. This lug 50 is provided on its forward side with a slot 52 through which projects a rack 53 which is formed on this side of the stem. At a point remote from the sleeve 50, a bracket 51 is provided, having a guide opening 54 which is of angular form, as shown.

On the upper end of the spindle or stem 48, an arm 55 is rigidly attached by means of a clamping head 56, and this arm 55 has a tongue 57 which projects downwardly and extends parallel with the axis of the stem. This tongue 57 is received in the angular opening 54 and forms a rigid guide for the stem which will effectually prevent any twisting of the stem on its longitudinal axis. In this connection it should be understood that such a twisting tendency is developed at the presser foot by the pressure of the meat. The outer portion of the bracket 51 is formed into a bearing 58 in which there is rotatably mounted an adjusting shaft 59, operated by a hand wheel 60. The inner end of this shaft 59 is of reduced diameter and is mounted to slide and rotate in a bearing 61 formed in the frame plate 1. Adjacent to this bearing 61 the shaft 59 is provided with a pinion 62 which meshes with the rack 53, and between the pinion and the bearing 58, a helical spring 63 is coiled upon the shaft. One end of this spring is rigidly attached at 64 to the bearing 58 and the other end is rigidly attached to the shaft. This spring tends to rotate the shaft in a direction to force the stem 48 downwardly so as to exert pressure on the meat by the presser foot. The spring 63 normally holds the pinion 62 over against the bearing 61 and in mesh with the rack. By pulling the shaft outwardly by means of the hand wheel 60, the pinion can be moved out of engagement with the rack, as indicated in dotted lines in Fig. 2. This arrangement enables the shaft to be rotated more or less so as to adjust the torsional tension of the spring, whereupon the pinion can be reëngaged with the rack. In this way the force exerted by the presser foot can be nicely regulated, and at all times the presser foot may be raised by rotating the hand wheel. On the side face of the knife 39, which is adjacent to the frame plate 1, I provide anti-friction rollers 65, as indicated in Fig. 1.

While it should be understood that the hand wheel 12 affords means for feeding the meat by hand, I provide also automatic means for advancing the meat actuated by the moving knife. For this purpose the shaft 40 is provided with an adjusting collar 66, as indicated in Fig. 3. The inner edge of this collar is formed with equidistant notches 67, and these notches are adapted to receive outwardly projecting lugs 68 which project from the hub 69 of a feed arm 70. This feed arm is provided with a longitudinal slot 71 in which an adjustable wing nut 72 is mounted. This wing nut affords means for securing a link 73, which link extends over to a pawl arm 74, as indicated in Fig. 6. This pawl arm is provided with a slot 75 in which an adjusting wing nut 76 is mounted, and to this wing nut the lower end of the link 73 is attached. On the end of the feed screw 11 adjacent to the frame plate 1, a pawl carrier 77 is loosely mounted, and this pawl carrier is pivotally attached by a screw 78 to the pawl arm 74. Adjacent to this pawl carrier, a ratchet wheel 79 is rigidly attached to the feed screw, and coöperating with the teeth of this ratchet wheel, a pawl 80 is provided which is rigid with the pawl arm 74. This pawl 80 is normally in engagement with the teeth of the ratchet wheel 79, and as the arm 74 is rocked through the operation of the link 73, the pawl advances the ratchet wheel and rotates the feed screw. The under side of the inner end of the pawl arm 74 is formed into a guard finger 81 which projects down under the ratchet wheel and operates as a fulcrum for the arm 74 to swing the pawl carrier on the axis of the feed screw.

The mechanism described will evidently afford means for giving the feed screw an automatic movement when the knife is being operated. I provide means for automatically throwing the feed out of connection. The purpose of this automatic arrangement is to prevent any possibility of the meat holders or pushers 38 from coming in contact with the knife. In this connection, referring to Fig. 5, attention is called to the forward end of the sleeve 18 which is formed so as to present a conical shoulder 83. As indicated in Fig. 6, from the lower end of the pawl arm 74, and on its upper edge, a leaf spring 84 extends downwardly, and this leaf spring has a shoe 85 attached to its lower end which normally rests against the upper side of the feed screw at this point. Now when the cross head 17 advances sufficiently, the conical shoulder 83 strikes the under side of the shoe 85 and raises it, this rotates the pawl arm on the pivot screw 78 and throws the pawl 80 out of engagement with the ratchet wheel. I employ a spring at this point for the reason that if a rigid member is employed instead of a spring, the lifting force exerted by the conical shoulder 83 would tend to throw the pawl 80 out of engagement at once, and this might tend to break its engaged extremity, or else break the tooth with which the pawl is in engagement. By arranging the spring as described, the spring simply exerts a tendency to throw the pawl out of engagement with the ratchet, but it is not of sufficient strength to do so on the advancing or feeding movement of the pawl, but as soon as the pawl moves back to engage the ratchet again, that is, on the idle movement of the pawl, the spring throws it out of engagement. On account of the adjusting collar 66, the feed arm 70 can be adjusted to any one of a number of predetermined positions, and the collar may be rigidly secured in any one of these positions by a set screw 69$^a$.

The mode of operation of the machine will now be described: The meat is placed in the cradle formed by the worm shafts 6, and the meat holders or pushers 38 are firmly engaged in the upper side of the meat and clamped rigidly in position by means of the screw plug. In order to bring the cross head 17 in the proper position, it can be slid along the feed rod and the rod 6$^a$ simply by releasing the nut, as will be readily understood. The meat is then advanced in this way until it comes under the presser foot, and the spring of the presser foot is then adjusted so that it will exert the proper pressure upon the meat. Now when the knife is rotated, the feed screw will be rotated by an intermittent movement and through the operation of the chain 14 all of the worm shafts will rotate. These worm shafts will support the meat and will advance it toward the knife. On account of the fact that the worms project above the feed rest, these worms will exert their advancing movement on the meat until it is actually sliced. After the cross head has sufficiently advanced, the automatic feed is thrown out by the conical shoulder 83 in the manner just described.

As suggested above the worms 6 rotate in opposite directions alternately, and my object in rotating them in this manner is to prevent them from exerting any tendency to twist or feed the meat laterally of the machine. Evidently, the twisting movement exerted by one worm will be substantially counterbalanced by an opposite twisting movement of the adjacent worm. One of the objects of providing the guide arm 55 in connection with the stem 48 is to prevent any tendency of the rack 53 to be worn away on its side faces at the slot 52.

The pitch of the feed screw 11 should be the same as the pitch of the worms 7, so that the feeding movement given to the meat by the cross head will be the same as that given to it by the worms.

Having thus described my invention, I claim as new and desire to secure by Letters Patent,—

1. In a machine of the class described, in combination, a frame, a pair of oppositely disposed substantially parallel rotary shafts, a cross head having sleeves surrounding said shafts and adapted to be advanced along said shafts, one of said shafts being adapted to release said cross head to permit the same to be swung upwardly on the opposite shaft as an axis of rotation, pushers carried by said cross head adapted to engage the meat, and a knife toward which the meat advances.

2. In a machine of the class described, in combination, a frame, a plurality of worm shafts mounted in said frame and adapted to support the meat, means for rotating the said worm shafts to advance the meat, a cross head, a feed screw disposed longitudinally with respect to said worm shafts of the same pitch as worm shafts, means carried by said cross head for engaging the meat to advance the same, a knife, and means for actuating said worm shafts and said feed screw to advance the meat.

3. In a machine of the class described, in combination, a frame, a knife mounted thereon, a presser foot mounted adjacent to said knife having a spindle, means for guiding said spindle on said frame, said spindle having a rack thereupon, a pinion meshing with said rack adapted to raise and lower said presser foot, and a guide arm attached to said spindle and having a tongue remote from said spindle guided on said frame.

4. In a machine of the class described, in combination, a frame, a knife mounted on said frame and adapted to slice the meat, a presser foot having a spindle mounted to slide longitudinally in said frame, a shaft rotatably mounted adjacent to said spindle, said spindle having a rack, and a pinion carried by said shaft engaging with said rack to raise and lower said presser foot, said shaft having a spring mounted thereupon, said pinion being adapted to slide laterally out of engagement with said rack to adjust the tension of said spring.

5. In a machine of the class described, in combination, a frame, a knife mounted thereupon for slicing the meat, a presser foot having a spindle mounted to slide longitudinally, a rack on said spindle, a pinion shaft mounted to rotate and slide, a pinion carried by said pinion shaft engaging said rack, and a spring disposed around said pinion shaft, having one end attached so as to rotate with said shaft and having the other end fixed, the sliding movement of said pinion shaft permitting the disengagement of said pinion with said rack to adjust the tension of said spring.

6. In a machine of the class described, in combination, a frame, a knife mounted upon said frame and adapted to slice the meat, a presser foot adjacent to said knife having a longitudinally guided spindle, a rack formed on said spindle, a pinion meshing with said rack and adapted to raise and lower said presser foot, means for rotating said pinion, a spring tending to force said presser foot downwardly, and a guide arm clamped to said spindle and guided on said frame at a point remote from said spindle.

7. In a machine of the class described, in combination, a frame, a knife mounted upon said frame and adapted to slice the meat, a presser foot mounted on said frame having a spindle sliding longitudinally, said spindle having a rack on the side thereof, a pinion shaft mounted to rotate and slide, a pinion mounted on said pinion shaft meshing with said rack and adapted to be disengaged from said rack by sliding said pinion shaft, a spring disposed around said pinion shaft and tending to rotate said shaft in a direction to force said presser foot downwardly, and a guide arm attached to said spindle and guided on said frame at a point remote from said spindle.

8. In a machine of the class described, in combination, a frame, a cross head, means for guiding said cross head along said frame, a feed screw for advancing said cross head, a ratchet wheel carried by said feed screw, a pawl carrier pivotally mounted on said feed screw, a pawl arm pivotally attached to said pawl carrier and having a pawl engaging said ratchet wheel, a knife for slicing the meat, and means for actuating said pawl arm from said knife, said pawl arm having a resilient extension disposed adjacent to said feed screw, said cross head having a shoulder adapted to engage said extension to throw out said pawl.

9. In a machine of the class described, in combination, a frame having a feed rest, a knife mounted to move adjacent to said feed rest for slicing the meat, a plurality of worm shafts adapted to support and advance the meat, said worm shafts having unreduced ends rotatably mounted in said feed rest and projecting above the upper face thereof, and means for rotating said worm shafts to advance the meat, the threads of said worm shafts being continued to the extremity of said shafts.

10. In a machine of the class described, in combination, a frame, a knife mounted on said frame and adapted to slice the meat, said frame having a feed rest adjacent to said knife, said feed rest having openings in the upper edge thereof, a plurality of worm shafts having unreduced ends rotatably mounted in said openings and projecting above the face of said feed rest, and means for rotating said worm shafts to advance the meat toward said knife, the threads of said worm shafts being continued to the ends thereof.

In testimony whereof I have signed my name to this specification in the presence of two subscribing witnesses.

ALFRED W. JOHNSON.

Witnesses:
　JOHN A. BAURIES,
　EDWARD C. JOHNSON.